Figure 1:
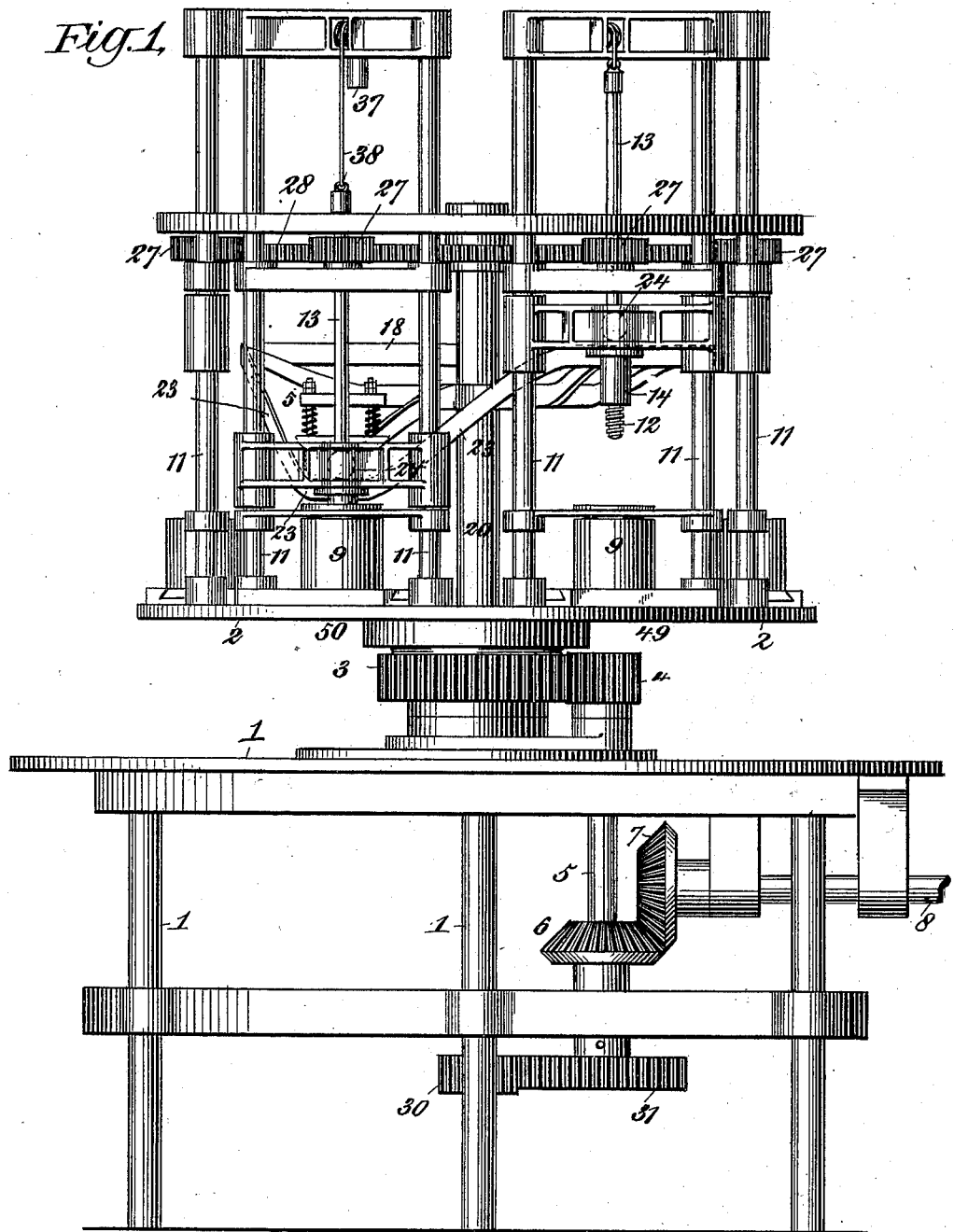

No. 646,949. Patented Apr. 10, 1900.
H. M. BROOKFIELD.
PRESS FOR MOLDING INSULATORS OR SIMILAR ARTICLES.
(Application filed Feb. 23, 1899.)
(No Model.) 5 Sheets—Sheet 1.

WITNESSES: INVENTOR
Henry M. Brookfield
BY
Kenyon & Kenyon
ATTORNEYS

No. 646,949. Patented Apr. 10, 1900.
H. M. BROOKFIELD.
PRESS FOR MOLDING INSULATORS OR SIMILAR ARTICLES.
(Application filed Feb. 23, 1899.)
(No Model.) 5 Sheets—Sheet 3.

WITNESSES:

INVENTOR
Henry M. Brookfield
BY
Kenyon & Kenyon
ATTORNEYS

No. 646,949. Patented Apr. 10, 1900.
H. M. BROOKFIELD.
PRESS FOR MOLDING INSULATORS OR SIMILAR ARTICLES.
(Application filed Feb. 23, 1899.)
(No Model.) 5 Sheets—Sheet 4.
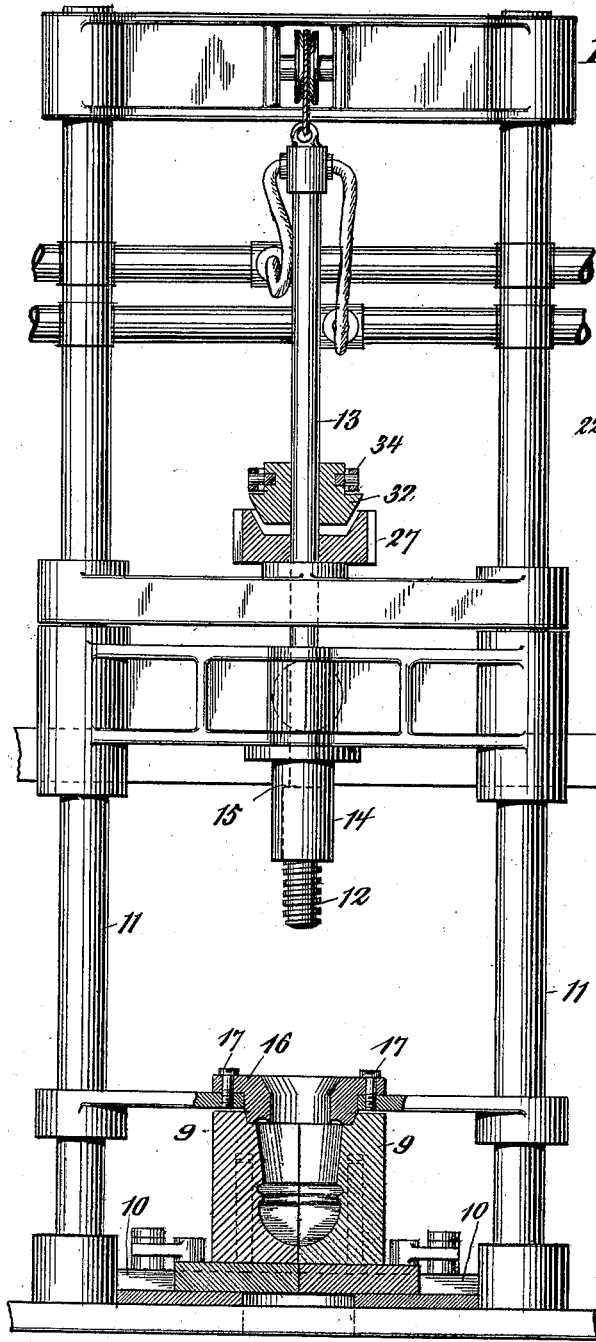
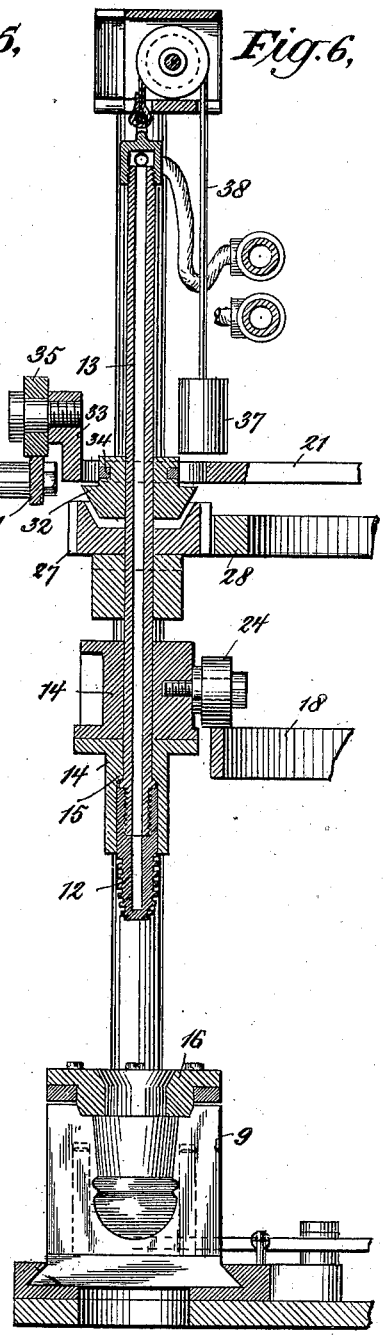
Fig. 5.
Fig. 6.
WITNESSES:
INVENTOR
Henry M. Brookfield
BY
Kenyon & Kenyon
ATTORNEYS No. 646,949. Patented Apr. 10, 1900.
H. M. BROOKFIELD.
PRESS FOR MOLDING INSULATORS OR SIMILAR ARTICLES.
(Application filed Feb. 23, 1899.)
(No Model.) 5 Sheets—Sheet 5.
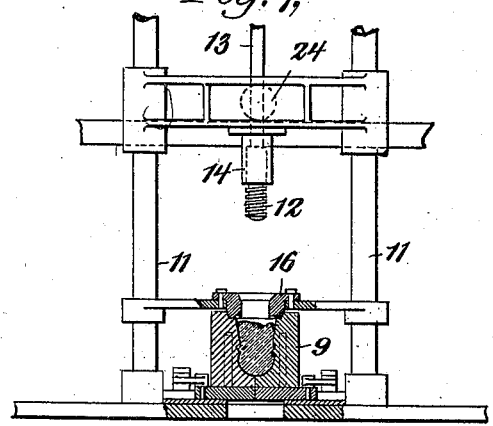
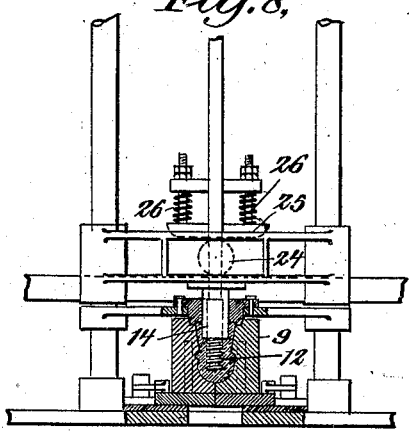
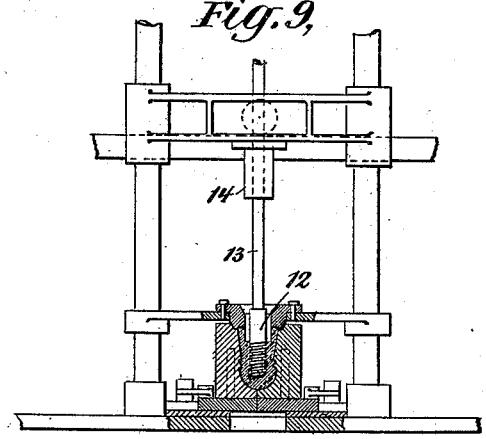
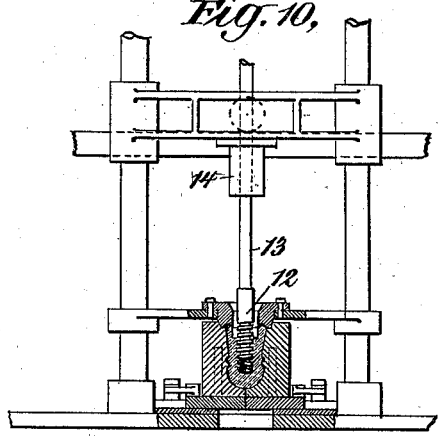
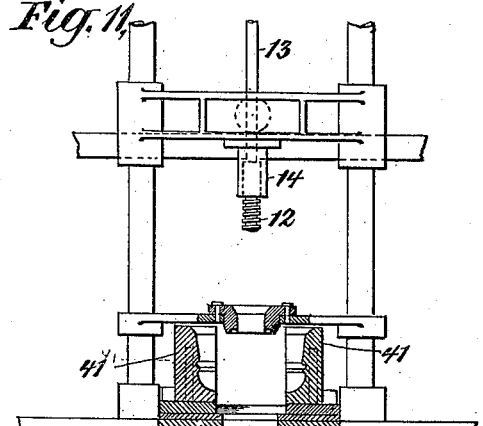
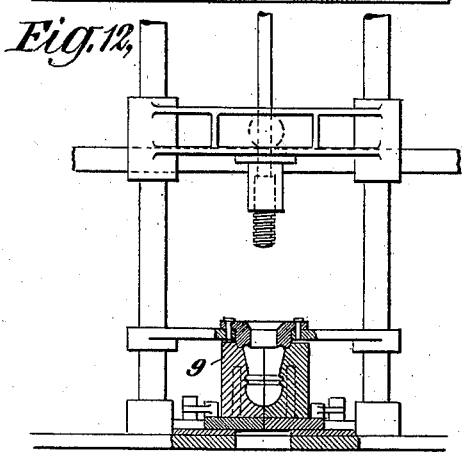
WITNESSES:
INVENTOR
Henry M. Brookfield
BY
Kenyon & Kenyon
ATTORNEYS

UNITED STATES PATENT OFFICE.

HENRY M. BROOKFIELD, OF NEW YORK, N. Y.

PRESS FOR MOLDING INSULATORS OR SIMILAR ARTICLES.

SPECIFICATION forming part of Letters Patent No. 646,949, dated April 10, 1900.

Application filed February 23, 1899. Serial No. 706,455. (No model.)

*To all whom it may concern:*

Be it known that I, HENRY M. BROOKFIELD, of New York, in the county and State of New York, have invented a certain new and useful Improvement in Presses for Molding Insulators or Similar Articles, of which the following is a specification.

My invention relates to presses for molding insulators or similar articles.

It has for its object to provide means for molding insulators which shall be automatic in operation, in which the moving parts shall be continuously operated, which shall be lighter and simpler in construction, and which can be run with less power than has heretofore been necessary in such presses; also, to provide improved means for discharging the finished insulators from the press.

Heretofore presses for molding insulators or similar articles have been made which have been more or less automatic in character; but in none of these has the entire operation of the machine been automatic, and in these machines it has been usual and necessary to make the movement of the moving parts intermittent in character. In my improved press all of the operations are automatic except the pouring of the molten glass into the molds, and the movement of the moving parts is continuous and not intermittent. My improved press is therefore more easily controlled, is more economical, and is capable of doing more work than other presses.

In the drawings accompanying this specification and forming part hereof, and in which corresponding reference characters indicate similar parts I have shown and will now proceed to describe the preferred form of my improved device.

Figure 2:
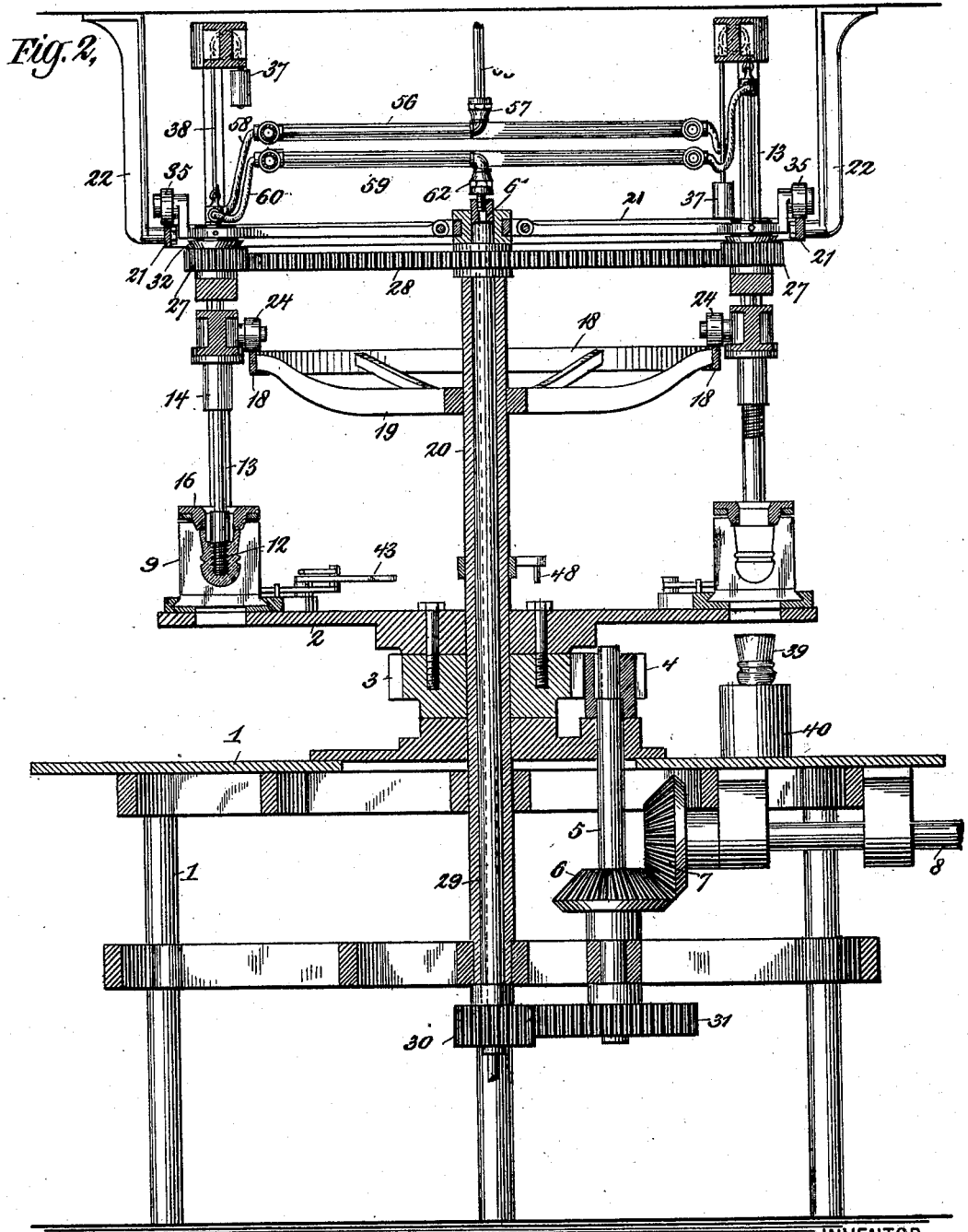
Figure 3:
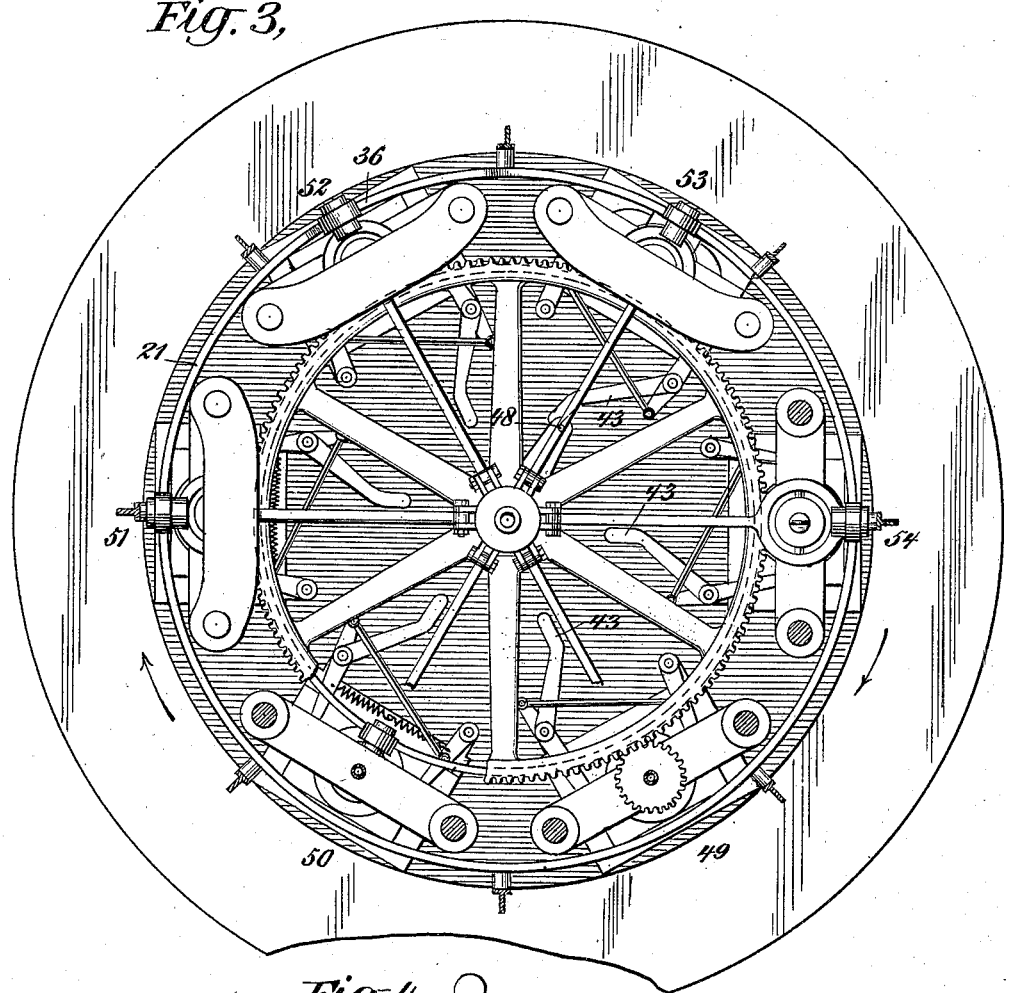
Figure 4:
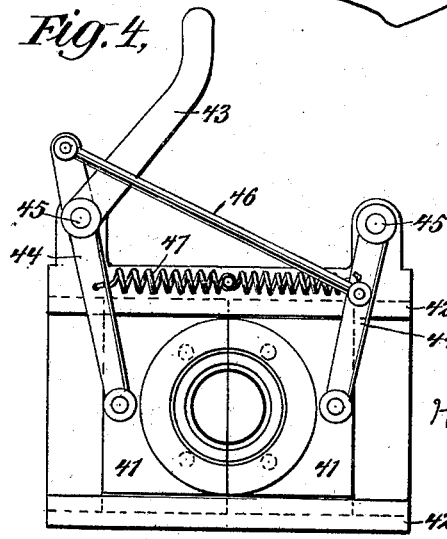

Figure 1 is an elevation of an embodiment of my improved press. Fig. 2 is a vertical section through the middle of the same. Fig. 3 is a plan of the same. Fig. 4 is a plan view of a mold. Fig. 5 is a vertical section through a mold and its frame and connecting parts. Fig. 6 is a vertical cross-section through the same at right angles to that of Fig. 5. Figs. 7 to 12, inclusive, are vertical sections through a mold and its connecting parts, showing different stages in the molding of an insulator.

Referring now to the embodiment shown in the drawings, 1 is the base or support, and 2 is a revolving table supported upon the base and free to revolve thereon. It is caused to revolve by a gear-wheel 3, secured to it and meshing with a gear 4 on shaft 5, the shaft carrying a beveled gear 6, which meshes with a beveled gear 7 upon shaft 8, the latter shaft being driven from any suitable source of power. By the above-described mechanism the table is continuously revolved upon the base or support.

Upon the revolving table I mount one or more molds 9. In the form shown in the drawings there are six of these molds. Each mold is supported on the table in guides 10. Table 2 also carries posts 11. Each frame and mold has a screw-plunger 12, secured to a spindle 13. As shown, the plunger 12 is secured to spindle 13 by screw-threads, although the two may be secured together in any suitable manner. The plunger is provided at its lower end with exterior screw-threads, as shown, to engage with the molten glass in the mold in the usual manner. Loosely encircling the spindle and a part of the screw-plunger is the former 14, which former rests upon a shoulder 15 of the screw-plunger.

16 is the follower. Heretofore in presses for making insulators the follower has been made movable and has been brought down against the molten glass in the mold during the process of molding and has been removed therefrom after that operation has been completed. My improved follower is made integral with or is securely fastened to the frame which supports the mold, as clearly shown in Fig. 6, where it is secured by screws 17. In this way the follower is substantially made an integral part of the mold itself and is stationary instead of movable. I am thus enabled to dispense with the use of springs, which have heretofore been necessary with movable followers, and I am thus enabled to make this part of the machine lighter and simpler in construction, and in the operation of the machine I am enabled to save power. By means of my improved follower and my improved form of mold, constructed as hereinafter described, I am also enabled to make molds of an improved form or pattern, as will be presently described.

In the operation of the press the former and plunger are brought down into engagement with the molten glass in the mold in order to properly shape the insulator to be made. The former is then withdrawn, and when the glass has sufficiently cooled the spindle 13 is rotated, so as to draw screw-plunger 12 out from the insulator that has been formed, and the spindle and plunger are then raised to their normal position. These various operations are illustrated in Figs. 7 to 12 and are carried out by the following-described mechanism and in the following manner: The plunger, former, and spindle are actuated by means of cams by reason of the cams and the table or support carrying the plunger, former, and spindle having a movement relative to each other, so as to cause the cams to engage with the said parts to actuate them. This relative movement I effect by preferably causing the table to move and the cams to remain stationary. In the form shown in the drawings the table revolves and the cams are stationary cam-tracks, which are substantially circular and which extend around the press. There are two of these cams, one, 18, supported on brackets 19 and stationary post 20, which is secured to the base of the press, and the other track 21, mounted on brackets 22, secured to the ceiling. Cam 18 is for the purpose of lowering the plunger and former into the mold and of raising the former to its normal position, and cam 21 is for the purpose of rotating the spindle 13 to withdraw the plunger from the mold. Cam-track 18 has a depression 23 in one part of its length. Upon the cam-track runs a wheel 24, secured to former 14. When wheel 24 runs down into depression 23 of the track, the weight of former 14 causes it to fall and to carry down with it screw-plunger 12, thus lowering both the screw-plunger and the former into the molten glass in the mold, as shown in Fig. 8. To insure that the former and screw-plunger will be forced into the mold by the proper degree of pressure, I preferably insert at this point a cam 25, secured to the framework of the press in any suitable manner. It is arranged immediately over the lowest part of depression 23 in track 18 and at such a height above the track as to permit wheel 24 to pass between it and the track, thus forcing the former and plunger down into their proper positions in the mold. As shown, I preferably employ springs 26 to permit cam 25 to yield slightly. Cam 25 thus automatically engages with the former while the latter is in the mold and exerts pressure upon it and the plunger. As the table continues to rotate, wheel 24 runs up the opposite side of depression 23 in track 18 and raises the former out of the mold, bringing it back to its original position. (Shown in Fig. 9.)

Screw-plunger 12 is withdrawn from the mold by the rotation of spindle 13. This is accomplished by cam-track 21 by means of the following-described mechanism: Upon spindle 13 is loosely mounted a gear-wheel 27. This gear-wheel is secured to a part of the framework of the press, so as to be incapable of vertical motion. It meshes with a large gear-wheel 28, mounted upon a shaft 29 inside of post 20. At the lower end of shaft 29 is a gear-wheel 30, which meshes with gear 31 upon shaft 5. Large gear-wheel 28 is thus continuously driven by the driving mechanism of the press and from the same source of power that revolves the table. The rotation of gear-wheel 27 is imparted to spindle 13 at the proper time by means of clutch 32. This clutch is splined to the spindle, so as to be free to move vertically thereon, but to be restrained from revolution around the same. The clutch is mounted in a support 33 by means of a collar 34 and is free to rotate on this collar. Support 33 is carried by a wheel 35, running upon cam-track 21. At one point of this cam-track—namely, at point 36—there is a depression in the track. When wheel 35 reaches this depression, it runs downward into it, forcing clutch 32 into engagement with gear-wheel 27 and causing spindle 13 to rotate. This depression is so placed in track 21 that this rotation of spindle 13 will be begun at the time in the revolution of the table when the glass in the mold has become sufficiently cool and hardened to permit of the withdrawal of the screw-plunger therefrom. The rotation of spindle 13 unscrews screw-plunger 12 from the form-insulator, as shown in Fig. 10, where this operation is partially performed. As soon as screw-plunger 12 is disengaged from the glass in the mold a weight 37 at the end of cord 38, the latter secured at its other end to the upper part of spindle 13, raises the spindle and screw-plunger to their original position, as shown in Fig. 11. At substantially the same time the mold is automatically caused to open to permit the completed insulator 39 to fall from the mold upon any suitable receiving-surface, such as a pad of asbestos 40. (Shown in Fig. 2.) Fig. 11 shows the insulator in the act of falling. In order to thus automatically discharge the insulator from the mold, I preferably make the mold of separable parts, which together form the completed mold, and I provide means for moving these parts bodily and directly away from the insulator or other article after it has been molded. In the form shown I have made the mold of two separable halves 41 41, these two halves forming the complete mold. Each half is movable bodily and directly away from the other half in guides 42 42 of the frame for the mold. These parts are moved away from each other by means of a lever 43, which is connected to each form, so that when the lever is forced one way it will separate the two halves. The means shown for connecting the lever with the halves consists of levers 44 44, secured at one end to one of the halves and fulcrumed at 45 45 to the frame. Lever 43 is fixedly secured to one of the levers 44 at point 45, and the two levers are connected by a rod 46, as shown. Springs 47, secured to the levers 44 and to the frame, tend to pull the two halves of the mold together and to keep them together. The mold is opened automatically by means of a pin 48 upon the stationary framework of the press and the end of lever 43 making contact therewith as the table revolves, as shown in Fig. 3. This pin is arranged in the framework of the press at such a point that the mold will be automatically opened immediately after the screw-plunger has been withdrawn from the mold. After this operation the mold and its connecting parts are in the position shown in Fig. 12 and are ready to receive another supply of molten glass, as shown in Fig. 7, and for a repetition of the operation just described.

Each mold upon the table is provided with a screw-plunger, former, spindle, follower, and lever for opening the mold and their connecting parts, as above described.

In practice the operator who supplies the liquid glass stands at the position repesented by the numeral 49 in Fig. 3 and pours the requisite amount of molten glass into each mold of the revolving table as it comes around to him. The table then revolves in the direction of the arrows shown in Fig. 3, and by the means already described the screw-plunger and former are first lowered into the mold into the position shown in Fig. 8 and at 50 in Fig. 3. The former is then raised into the position shown in Fig. 9 corresponding with the position 51 in Fig. 3. The spindle is then rotated, and the screw-plunger is unscrewed from the glass, as shown in Fig. 10, corresponding with position 52 in Fig. 3. The mold is then opened and the insulator drops out, as shown in Fig. 11, corresponding with position 53 in Fig. 3, and then the springs 47 47 pull the two halves of the mold together, bringing them into the position shown in Fig. 12 ready for the next operation, corresponding in this particular with position 54. (Shown in Fig. 3.) The table revolves continuously, and the entire action except the pouring of the molten glass into the mold is automatic.

In order to prevent the overheating of the screw-plunger, I provide the following-described improved cooling devices. For this purpose each screw-plunger and each spindle is made hollow, as shown in Fig. 6, and a constant stream of cooling fluid is supplied to the interior of the spindle and the screw-plunger by the following-described mechanism:

55 is a supply-pipe for supplying cooling fluid from any suitable source. It is connected with a shorter revolving pipe 56, connected by a suitable joint 57 with pipe 55 and by a flexible hose 58 with the spindle. A revolving discharge-pipe 59 is connected with the hollow spindle by means of a hose 60, and the revolving discharge-pipe is connected with a discharge-pipe 61 by means of a swivel-joint 62. In this manner a constant supply of cooling fluid is furnished to the interior of the spindle and the hollow screw-plunger and keeps the latter from becoming overheated.

Many modifications can be made in the devices shown in the drawings without departing from my invention. For example, it is not essential that the table or support for the former, plunger, and spindle and their connecting parts should revolve and the cams be stationary. My invention would be embodied in this particular, provided these parts have any suitable relative movement in reference to each other. The form and arrangement of the cams and of many other parts of the devices shown could also be varied without departing from my invention.

In the embodiment of my invention shown in the drawings the former is shown as movable vertically to bring it down to and carry it up from the mold. This is not essential, however, to my broad invention, as cam 18, instead of operating the former and screw-plunger to lower them and to raise the former, might be so constructed and arranged as to raise the mold, bringing the latter up to the former, and the screw-plunger instead of bringing the former and screw-plunger down to the mold. In this embodiment of my invention the former would remain stationary at all times; but it would be necessary for the screw-plunger and its spindle to have a slight vertical movement in order to first permit the separation of the former and the molten glass in the mold from each other before the spindle and mold are rotated relative to each other to unscrew the screw-plunger to withdraw it from the insulator. In all of these embodiments of my invention the cams and the support have a movement relative to each other, thus causing the cams to actuate the movable parts to actuate the machine.

What I claim as new, and desire to secure by Letters Patent, is—

1. In a press for molding insulators or similar articles, the combination of a suitable mold, a screw-plunger, a spindle therefor, a former and means for rotating the spindle, all connected and arranged together upon a suitable support and cams for actuating the said plunger, former and spindle, the said cams and said support being arranged so as to have movement relative to each other and so as to cause the cams to engage with said plunger, former and spindle to actuate them, and means for imparting such relative movement, whereby the cams will first cause the screw-plunger and former to engage with the molten glass in the mold, will then cause the former to withdraw and will then rotate the spindle to unscrew the screw-plunger and withdraw it from the insulator.

2. In a press for molding insulators or similar articles, the combination of a suitable mold, a screw-plunger, a spindle therefor, a former and means for rotating the spindle, all connected and arranged together upon a suitable support and cams for actuating the said plunger, former and spindle, the said cams and said support being arranged so as to have movement relative to each other and so as to cause the cams to engage with said plunger, former and spindle to actuate them, and means for imparting such relative movement, whereby the cams will first cause the screw-plunger and former to engage with the molten glass in the mold, will then cause the former to withdraw and will then rotate the spindle to unscrew the screw-plunger and withdraw it from the insulator and to open the mold to permit the insulator or other article to drop out.

3. In a press for molding insulators or similar articles, the combination of a suitable mold, a follower, a screw-plunger, a spindle therefor, a former and means for rotating the spindle, all connected and arranged together upon a suitable support and cams for actuating the said plunger, former and spindle, the said cams and said support being arranged so as to have movement relative to each other and so as to cause the cams to engage with said plunger, former and spindle to actuate them, and means for imparting such relative movement, whereby the cams will first cause the screw-plunger and former to engage with the molten glass in the mold, will then cause the former to withdraw and will then rotate the spindle to unscrew the screw-plunger and withdraw it from the insulator.

4. In a press for molding insulators or similar articles, the combination of a suitable mold, a follower, a screw-plunger, a spindle therefor, a former and means for rotating the spindle, all connected and arranged together upon a suitable support and cams for actuating the said plunger, former and spindle, the said cams and said support being arranged so as to have movement relative to each other and so as to cause the cams to engage with said plunger, former and spindle to actuate them, and means for imparting such relative movement, whereby the cams will first cause the screw-plunger and former to engage with the molten glass in the mold, will then cause the former to withdraw and will then rotate the spindle to unscrew the screw-plunger and withdraw it from the insulator and to open the mold to permit the insulator or other article to drop out.

5. In a press for molding insulators or similar articles, the combination of a suitable mold, a screw-plunger, a spindle therefor, a former and means for rotating the spindle, all connected and arranged together upon a suitable revolving table and stationary support, cams for actuating the said plunger, former and spindle, the said cams and said parts being so arranged as to cause the cams and the plunger, former and spindle to engage as the table revolves to actuate the latter and means for revolving the table, whereby the cams will first cause the screw-plunger and former to engage with the molten glass in the mold, will then cause the former to withdraw and will then rotate the spindle to unscrew the screw-plunger and withdraw it from the insulator.

6. In a press for molding insulators or similar articles, the combination of a suitable mold, a screw-plunger, a spindle therefor, a former and means for rotating the spindle, all connected and arranged together upon a suitable revolving table and stationary support, cams for actuating the said plunger, former and spindle, the said cams and said parts being so arranged as to cause the cams and the plunger, former and spindle to engage as the table revolves to actuate the latter and means for revolving the table, whereby the cams will first cause the screw-plunger and former to engage with the molten glass in the mold, will then cause the former to withdraw and will then rotate the spindle to unscrew the screw-plunger and withdraw it from the insulator and to open the mold to permit the insulator or other article to drop out.

7. In a press for molding insulators or similar articles, the combination of a suitable mold, a follower, a screw-plunger, a spindle therefor, a former and means for rotating the spindle, all connected and arranged together upon a suitable revolving table and stationary support, cams for actuating the said plunger, former and spindle, the said cams and said parts being so arranged as to cause the cams and the plunger, former and spindle to engage as the table revolves to actuate the latter and means for revolving the table, whereby the cams will first cause the screw-plunger and former to engage with the molten glass in the mold, will then cause the former to withdraw and will then rotate the spindle to unscrew the screw-plunger and withdraw it from the insulator.

8. In a press for molding insulators or similar articles, the combination of a suitable mold, a follower, a screw-plunger, a spindle therefor, a former and means for rotating the spindle, all connected and arranged together upon a suitable revolving table and stationary support, cams for actuating the said plunger, former and spindle, the said cams and said parts being so arranged as to cause the cams and the plunger, former and spindle to engage as the table revolves to actuate the latter and means for revolving the table, whereby the cams will first cause the screw-plunger and former to engage with the molten glass in the mold, will then cause the former to withdraw and will then rotate the spindle to unscrew the screw-plunger and withdraw it from the insulator and to open the mold to permit the insulator or other article to drop out.

9. In a press for molding insulators or similar articles, the combination of a suitable mold, a screw-plunger, a spindle therefor, a former loosely encircling the spindle and resting upon the plunger, a stationary cam-track having a depression in one part of its length, a wheel connected with the former and adapted to run upon said track to lower the former and with it the plunger when it reaches the said depression to cause the plunger and former to engage with the molten glass in the mold and to raise the former when it passes out of the depression, to remove it from the mold, and a revolving table, upon which the mold, plunger, spindle and former are carried, and means for rotating the spindle, adapted to be actuated at the proper point in the revolution of the table to unscrew the plunger and withdraw it from the insulator.

10. In a press for molding insulators or similar articles, the combination of a suitable mold, a screw-plunger, a spindle therefor, a former loosely encircling the spindle and resting upon the plunger, a stationary cam-track having a depression in one part of its length, a wheel connected with the former and adapted to run upon said track to lower the former and with it the plunger when it reaches the said depression to cause the plunger and former to engage with the molten glass in the mold, and to raise the former when it passes out of the depression to remove it from the mold, a stationary surface under which the wheel is adapted to run at the bottom of said depression and with which it is adapted to engage to insure the proper engagement of the plunger and former with the glass in the mold, and a revolving table, upon which the mold, plunger, spindle and former are carried, and means for rotating the spindle, adapted to be actuated at the proper point in the revolution of the table to unscrew the plunger and withdraw it from the insulator.

11. In a press for molding insulators or similar articles, the combination of a suitable mold, a screw-plunger, a spindle therefor, a former loosely encircling the spindle and resting upon the plunger, a stationary cam-track having a depression in one part of its length, a wheel connected with the former and adapted to run upon said track to lower the former and with it the plunger when it reaches the said depression to cause the plunger and former to engage with the molten glass in the mold and to raise the former when it passes out of the depression, to remove it from the mold, and a revolving table, upon which the mold, plunger, spindle and former are carried, a gear-wheel loosely mounted upon the spindle, means for driving it, a clutch splined to the spindle so as to be free to move vertically thereon but restrained from revolution therein, a sleeve within which the clutch gear-wheel is free to rotate, but upon which it is restrained from vertical motion, a wheel connected with the sleeve, a stationary cam-track upon which said wheel is adapted to run, a depression therein so arranged as to cause the clutch gear-wheel to make contact with the first-mentioned gear to rotate the spindle and plunger when the plunger is to be withdrawn from the insulator.

12. In a press for molding insulators or similar articles, the combination of a suitable mold, a screw-plunger, a spindle therefor, a former loosely encircling the spindle and resting upon the plunger, a stationary cam-track having a depression in one part of its length, a wheel connected with the former and adapted to run upon said track to lower the former and with it the plunger when it reaches the said depression to cause the plunger and former to engage with the molten glass in the mold and to raise the former when it passes out of the depression, to remove it from the mold, a stationary cam-surface under which the wheel is adapted to run at the bottom of said depression and with which it is adapted to engage to insure the proper engagement of the plunger and former with the glass in the mold, and a revolving table, upon which the mold, plunger, spindle and former are carried, a gear-wheel loosely mounted upon the spindle, means for driving it, a clutch splined to the spindle so as to be free to move vertically thereon but restrained from revolution therein, a sleeve within which the clutch gear-wheel is free to rotate, but upon which it is restrained from vertical motion, a wheel connected with the sleeve, a stationary cam-track upon which said wheel is adapted to run, a depression therein so arranged as to cause the clutch gear-wheel to make contact with the first-mentioned gear to rotate the spindle and plunger when the plunger is to be withdrawn from the insulator.

13. In a press for molding insulators or similar articles, the combination of a suitable mold, a screw-plunger, a spindle therefor, a former, and a revolving table, upon which the mold, plunger, spindle and former are carried, means adapted to be actuated at the proper point in the revolution of the table for causing the screw-plunger and former to engage with the molten glass in the mold and then to withdraw the former from such engagement, a gear-wheel loosely mounted upon the spindle, means for driving it, a clutch splined to the spindle so as to be free to move vertically thereon but restrained from revolution therein, a sleeve within which the clutch gear-wheel is free to rotate, but upon which it is restrained from vertical motion, a wheel connected with the sleeve, a stationary cam-track upon which said wheel is adapted to run, a depression therein so arranged as to cause the clutch gear-wheel to make contact with the first-mentioned gear to rotate the spindle and plunger when the plunger is to be withdrawn from the insulator.

14. In a press for molding insulators or similar articles, the combination of a suitable mold, a screw-plunger, a spindle therefor, a former, and a revolving table, upon which the mold, plunger, spindle and former are carried, means for revolving the table driven by the driving mechanism of the press, means adapted to be actuated at the proper point in the revolution of the table for causing the screw-plunger and former to engage with the molten glass in the mold and then to withdraw the former from such engagement, a gear-wheel loosely mounted upon the spindle, a clutch splined to the spindle so as to be free to move vertically thereon but restrained from revolution therein, means for automatically operating the clutch to connect the gear-wheel to the spindle to rotate the latter, a large gear-wheel with which the loose gear-wheel upon the spindle is adapted to mesh at all times during the revolution of the table, and means, driven by the driving mechanism of the press, for driving said large gear-wheel, whereby the table will be automatically revolved, the screw-plunger and former will be automatically lowered, the former then be automatically raised at the proper times and the spindle then be automatically rotated to withdraw the plunger from the mold.

15. In a press for molding insulators or similar articles, the combination of a suitable mold, a screw-plunger, a spindle therefor, a former, and a revolving table, upon which the mold, plunger, spindle and former are carried, means for revolving the table driven by the driving mechanism of the press, means adapted to be actuated at the proper point in the revolution of the table for causing the screw-plunger and former to engage with the molten glass in the mold and then to withdraw the former from such engagement, a gear-wheel loosely mounted upon the spindle, a large gear-wheel with which the loose gear-wheel upon the spindle is adapted to mesh at all times during the revolution of the table and means driven by the driving mechanism of the press for driving said large gear-wheel, a clutch splined to the spindle so as to be free to move vertically thereon but restrained from revolution therein, a sleeve within which the clutch gear-wheel is free to rotate, but upon which it is restrained from vertical motion, a wheel connected with the sleeve, a stationary cam-track upon which said wheel is adapted to run, a depression therein so arranged as to cause the clutch gear-wheel to make contact with the first-mentioned gear to rotate the spindle and plunger when the plunger is to be withdrawn from the insulator, whereby the table will be automatically revolved, the screw-plunger and former will be automatically lowered, the former then be automatically raised at the proper times and the spindle then be automatically rotated to withdraw the plunger from the mold.

16. In a press for molding insulators or similar articles, the combination of a hollow screw-plunger, a hollow spindle upon which the screw-plunger is mounted, a supply-pipe connected with the spindle for supplying a cold fluid to the spindle and screw-plunger to cool the latter and connected with any suitable source of supply of such fluid and a discharge pipe or vent also communicating with the spindle for discharging heated fluid therefrom whereby a constant supply of cooling fluid may be furnished to cool the screw-plunger.

17. In a press for molding insulators or similar articles, the combination of a revolving hollow screw-plunger, a revolving hollow spindle upon which the screw-plunger is mounted, a supply-pipe for supplying a cold fluid to the spindle and screw-plunger to cool the latter and connected with any suitable source of supply of such fluid, a revolving pipe connected with the supply-pipe by a swivel-joint, a flexible hose connecting the latter with the spindle to permit of vertical motion of the spindle, another flexible hose and revolving pipe having a swivel-joint connecting the spindle with the discharge-pipe, whereby a constant supply of cooling fluid may be furnished to cool the screw-plunger, without interfering with revolving and vertical motion of the spindle.

18. In a press for molding insulators or similar articles, the combination of a mold composed of two separable halves together forming the complete mold, a spring or equivalent device for holding the two halves together, a lever having its fulcrum on another part of the press and said lever connected to both halves, and adapted at the proper time in the operation of the press to contact with a pin fastened to another part of the press whereby said halves will be automatically moved directly and bodily away from the molded insulator or other article.

19. In a press for molding insulators or similar articles, the combination of a mold mounted upon a revolving table and composed of two separable halves together forming the complete mold, a spring or equivalent device for holding the two halves together, a lever having its fulcrum upon a part of the table and said lever connected to both halves, and adapted at the proper time in the operation of the press to contact with a stationary pin fastened to the framework of the press whereby said halves will be automatically moved directly and bodily away from the molded insulator or other article.

20. In a press for molding insulators or similar articles, the combination of a mold and a follower integral therewith or securely fastened thereto, substantially as set forth.

21. In a press for molding insulators or similar articles, the combination of a suitable mold, a screw-plunger, a spindle therefor, a former loosely encircling the spindle and resting upon the plunger, a cam-track having a depression in one part of its length, a wheel connected with the former and adapted to run upon said track to lower the former and with it the plunger when it reaches the said depression to cause the plunger and former to engage with the molten glass in the mold and to raise the former when it passes out of the depression, to remove it from the mold, a table upon which the mold, plunger, spindle and former are placed, the said cam-track and table being so arranged as to have movement relative to each other so as to actuate the plunger and former, means for imparting such relative movement and means for rotating said spindle at the proper time to withdraw the plunger from the mold, whereby the screw-plunger and former will be caused to engage with the molten glass in the mold to form the insulator, and will thereafter be withdrawn therefrom.

22. In a press for molding insulators or similar articles, the combination of a suitable mold, a screw-plunger, a spindle therefor, a former, means for lowering the plunger and former into the mold, a cam adapted to automatically engage with the former while the latter is in the mold to exert pressure upon the same and upon the plunger, and means for raising the former and plunger, whereby positive pressure will be automatically exerted upon the molten glass, substantially as set forth.

23. In a press for molding insulators or similar articles, the combination of a suitable mold, a screw-plunger, a spindle therefor, a former and means for rotating the spindle, all connected and arranged together upon a suitable support and cams for actuating the movable parts, the said cams and said support being arranged so as to have movement relative to each other and so as to cause the cams to engage with said movable parts to actuate them, and means for imparting such relative movement, whereby the cams will first cause the screw-plunger and former, and the molten glass in the mold to engage with each other, will then cause the separation of the former and the molten glass from each other, and will then cause the spindle to rotate relative to the mold to unscrew the screw-plunger to withdraw it from the insulator.

24. In a press for molding insulators or similar articles, the combination of a mold composed of separable parts and a follower integral with or securely fastened to the support carrying the mold, whereby the follower acts to center the mold and aids in the molding of the insulator or other article, substantially as set forth.

25. In a press for molding insulators or similar articles, the combination of a mold composed of separable parts and a follower integral with or securely fastened to the support carrying the mold, and having a circular groove adapted to come in contact with the molten glass in the mold, whereby the follower acts to center the mold and aids in molding the insulator or other article and produces a circular bead around the upper surface of the same, substantially as set forth.

In testimony whereof I have signed my name to this specification in the presence of two subscribing witnesses.

HENRY M. BROOKFIELD.

Witnesses:
GEO. W. MILLS, Jr.,
EDWIN SEGER.